(12) United States Patent
Schechtel et al.

(10) Patent No.: US 6,574,414 B2
(45) Date of Patent: Jun. 3, 2003

(54) LIGHT TRANSMISSION APPARATUS AND METHOD

(75) Inventors: Kevin J. Schechtel, Algonquin, IL (US); Kathleen A. Stunkel, Algonquin, IL (US); William L. Bollig, Elk Grove, IL (US)

(73) Assignee: 3Com Corporation, Rolling Meadows, IL (US)

( * ) Notice: Subject to any disclaimer, the term of this patent is extended or adjusted under 35 U.S.C. 154(b) by 118 days.

(21) Appl. No.: 09/756,088

(22) Filed: Jan. 8, 2001

(65) Prior Publication Data

US 2002/0090193 A1 Jul. 11, 2002

(51) Int. Cl.[7] .................................................. G02B 6/10
(52) U.S. Cl. ...................... 385/146; 385/901; 385/147; 345/82; 345/102; 345/44
(58) Field of Search ............................ 385/146; 345/82, 345/102, 87, 74, 75, 76, 44; 285/907

(56) References Cited

U.S. PATENT DOCUMENTS

| | | | | |
|---|---|---|---|---|
| 4,730,882 A | * | 3/1988 | Messerschmidt | 385/146 |
| 4,767,172 A | * | 8/1988 | Nichols et al. | 355/1 |
| 5,760,754 A | * | 6/1998 | Amero, Jr. et al. | 345/102 |
| 6,361,357 B1 | * | 3/2002 | Stillwell et al. | 362/26 |

* cited by examiner

Primary Examiner—Robert H. Kim
Assistant Examiner—George Wang
(74) Attorney, Agent, or Firm—Baniak Pine & Gannon

(57) ABSTRACT

A lightpipe apparatus and method includes a lightpipe body for transmitting light. The lightpipe body includes a receiving end portion for receiving the light and a display end portion. The lightpipe body further includes a first refractive surface disposed between the receiving end portion and the display end portion. An opaque substrate is applied to the first refractive surface to reflect the light toward the display end portion.

25 Claims, 2 Drawing Sheets

LIGHT TRANSMISSION APPARATUS AND METHOD

FIELD OF THE INVENTION

This invention relates generally to the field of light transmission devices and in particular, to a lightpipe apparatus and method for transmitting light.

BACKGROUND OF THE INVENTION

Conventional electronic devices such as, for example, desktop modems typically include one or more light indicators that extend through the outer casing of the device. These light indicators allow the user to monitor the various functions of the electronic device. Conventional light indicators are typically comprised of a transparent material to allow light to be transferred from an LED (light emitting diode) mounted on a circuit board within the device to a position outside of the outer casing. As a result, a first end portion of these conventional indicators is positioned adjacent to an LED on the circuit board within the outer casing, and the second end portion extends through the outer casing to allow the user to view the second end portion. When the LED is turned on and emits visible light, the light is transferred through the transparent light indicator to a position outside of the outer casing to provide notice to the user.

Problems arise when attempting to use these conventional light indicators to transfer light from the circuit board to a position outside of the outer casing. For example, there is oftentimes very little space within the outer shell of the housing to position these conventional light indicators in association with the circuit board. As a result, conventional light indicators typically are not configured in a straight line. Instead, they oftentimes have rather complicated and intricate configurations to allow them to fit within the available space between the circuit board and the outer shell. For example, in certain applications, they may have one or more bends between the circuit board and the outer shell. As a result, the light that is transmitted through the light indicator has to change directions one or more times. This, in turn, results in a certain amount of light loss as the light travels though the indicator thereby decreasing the light intensity to the user by as much as 70% in certain situations. This also results in an unequal distribution of light, thereby decreasing the visual impact of the indicator. Finally, the loss of light may also create "black spots" that can be seen by the user, which obviously reduces the effectiveness of the indicator.

These problems have been compounded by the fact that industrial designs of electronic devices are becoming more complex, and the amount of available space within the outer enclosure has been decreasing. As a result, the configuration of conventional light indicators has become even more complex in an attempt to transmit light through tight spaces and around sharp corners, which in turn has resulted in, in certain situations, even more light loss.

Attempts have been made to overcome these problems. For example, attempts have been made to apply a frosted finish to the exposed surface of the light indicator to more evenly distribute the light. However, this solution does nothing to preserve and/or increase the intensity of the light as it passes through the indicator. Moreover, attempts have been made to provide a light indicator that has a more simplified geometry. However, this may result in unacceptable limitations on the overall design of the electronic device, and may increase the design and manufacturing costs of the device.

Accordingly, it would be desirable to have an apparatus and method for transmitting light that overcomes the disadvantages described above.

SUMMARY OF THE INVENTION

One aspect of the invention provides a lightpipe apparatus including a lightpipe body for transmitting light. The lightpipe body includes a receiving end portion for receiving the light and a display end portion. The lightpipe body further includes a first refractive surface disposed between the receiving end portion and the display end portion. An opaque substrate is applied to the first refractive surface to reflect the light toward the display end portion. The lightpipe body may preferably be comprised of a transparent material such, for example, a polycarbonate. The receiving end portion may preferably have a concave shape, although other shapes are contemplated. The first refractive surface may preferably be aligned with the display end portion. The display end portion may preferably include a viewing surface, which may have an oval shape. The first refractive surface may preferably be angled with respect to the viewing surface. The first refractive surface may preferably be angled approximately 45 degrees with respect to the viewing surface. A light source may preferably be in communication with the receiving end portion of the lightpipe body. The light source may preferably be a light emitting diode. A circuit board may also be provided, and the light source may preferably be mounted to the circuit board. The lightpipe body may preferably include a second refractive surface positioned between the first refractive surface and the receiving end portion. The second refractive surface may preferably be positioned opposite the first refractive surface, and may preferably be angled with respect to the receiving end portion to direct the light from the receiving end portion to the first refractive surface. The second refractive surface may preferably be angled approximately 45 degrees with respect to the receiving end portion.

Another aspect of the invention provides a method of transmitting light through a lightpipe apparatus. A lightpipe body is provided. The lightpipe body includes a receiving end portion for receiving the light and a display end portion. The lightpipe body further includes a first refractive surface disposed between the receiving end portion and the display end portion. An opaque substrate is applied to the first refractive surface. The light is directed into the receiving end portion. The light is then directed from the receiving end portion to the first refractive surface and the opaque substrate. The light is reflected from the first refractive surface toward the display end portion. A second refractive surface may also be provided. The second refractive surface may preferably be positioned between the first refractive surface and the receiving end portion. The light may preferably be directed from the receiving end portion to the second refractive surface. The light may preferably be reflected from the second refractive surface to the first refractive surface.

Another aspect of the invention provides an electronic device including an outer protective enclosure. A circuit board is mounted within the outer protective enclosure. A light source for generating light is mounted on the circuit board. A lightpipe apparatus is disposed within the outer protective enclosure and is in communication with the light source. The lightpipe apparatus includes a lightpipe body for transmitting the light. The lightpipe body includes a receiving end portion for receiving the light and a display end portion. The lightpipe body further includes a first refractive surface disposed between the receiving end portion and the display end portion. An opaque substrate is applied to the first refractive surface to reflect the light toward the display end portion. The electronic device may preferably be a modem. The outer protective enclosure may preferably include at least one opening, and the display end portion may preferably extend through the opening. The receiving end portion may preferably be in communication with the light source.

Another aspect of the invention provides a system for transmitting light. A plurality of lightpipe bodies for transmitting light is spaced apart along a support member. Each of the plurality of lightpipe bodies includes a receiving end portion for receiving the light and a display end portion. Each of the lightpipe bodies further includes a first refractive surface disposed between the receiving end portion and the display end portion. An opaque substrate is applied to the first refractive surface to reflect the light toward the display end portion.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DETAILED DESCRIPTION OF THE PRESENTLY PREFERRED EMBODIMENTS

Figure 1:
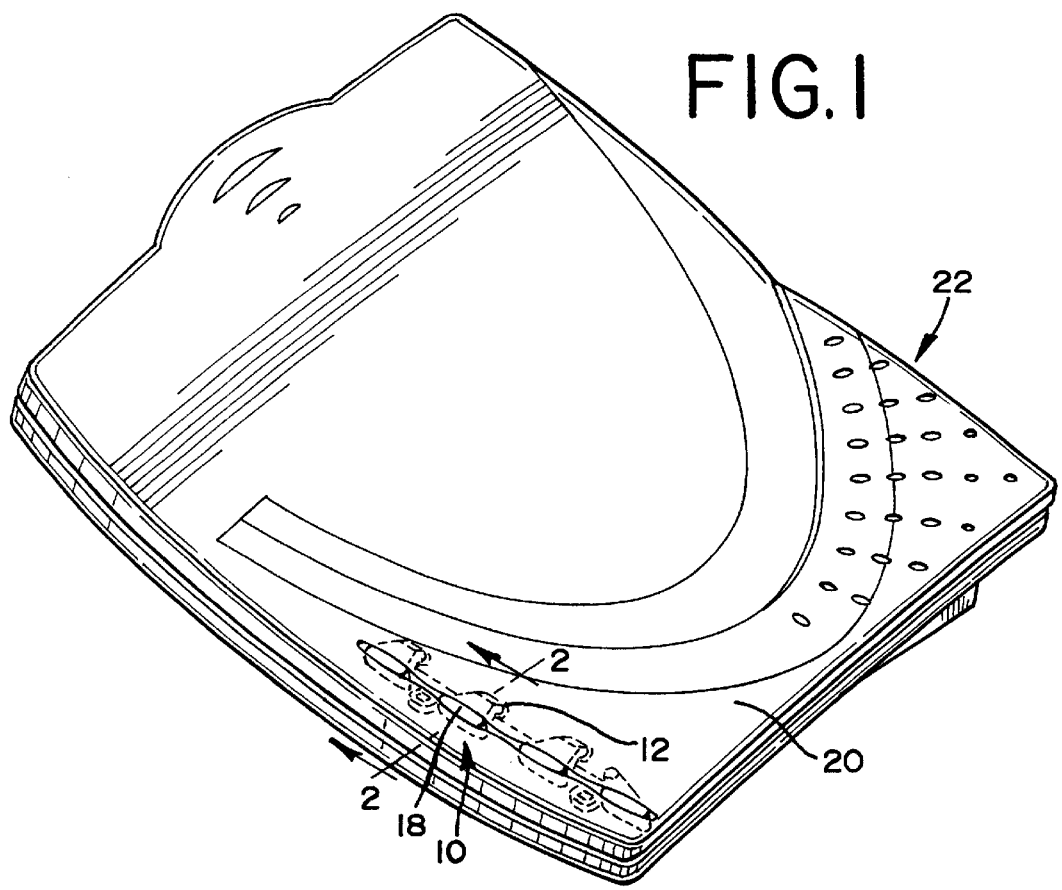
FIG. 1 is a perspective view of a preferred embodiment of a lightpipe apparatus that that is made in accordance with the invention wherein the lightpipe apparatus is shown mounted within the housing of an electronic device.
Figure 2:
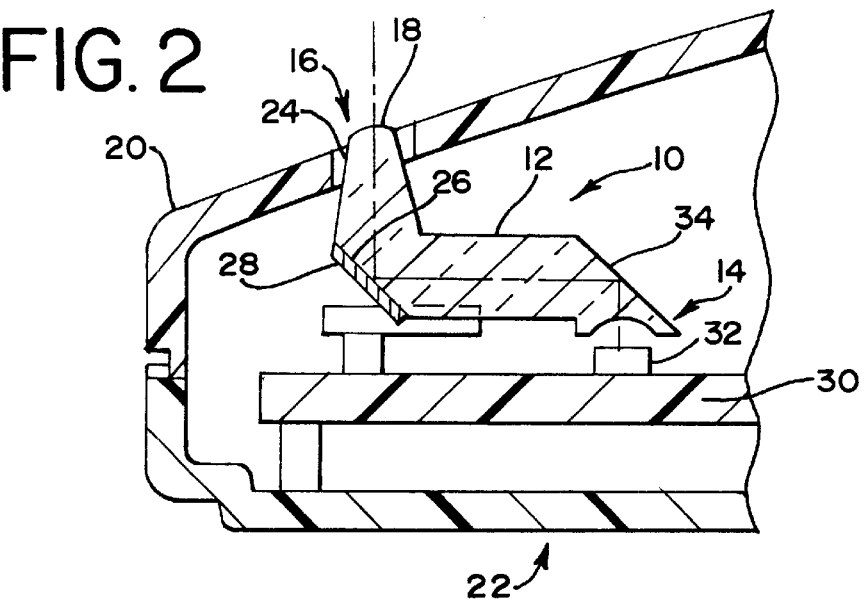
FIG. 2 is a sectional view taken along line 2—2 of FIG. 1.

Referring to FIGS. 1–5, a preferred embodiment of a lightpipe apparatus is shown generally at numeral 10. Referring to FIG. 2, the lightpipe apparatus 10 includes a lightpipe body 12 for transmitting light. The lightpipe body 12 may preferably be any solid transparent member for transmitting visible light. The shape and configuration of the lightpipe body 12 may vary depending upon the particular application. The lightpipe body 12 may preferably be comprised of any transparent material such as, for example, a polycarbonate.

As shown in FIG. 2, the lightpipe body 12 includes a receiving end portion 14. The receiving end portion 14 receives visible light generated by a light source as will be more fully discussed below. As shown in FIG. 2, the receiving end portion 14 may preferably have a concave shape, although other shapes and configurations are contemplated. The lightpipe body 12 further includes a display end portion 16. As shown in FIGS. 1 and 2, the display end portion 16 includes a viewing surface 18.

As shown in FIG. 1, the lightpipe body 12 may preferably be installed within the outer protective enclosure 20 of an electronic device 22 such as, for example, a modem. It should be understood, however, that the lightpipe apparatus 10 may preferably be used within any other type of electronic device. As shown in FIG. 2, the display end portion 16, and in particular the viewing surface 18, may preferably extend through an opening 24 in the outer protective enclosure 20 of the electronic device 22 to allow a user to view the viewing surface 18. In the embodiment shown, the viewing surface 18 has an oval shape, although other shapes and configurations are contemplated.

Referring again to FIG. 2, the lightpipe body 12 further includes a first refractive surface 26 disposed between the receiving end portion 14 and the display end portion 16. In the embodiment shown, the first refractive surface 26 is aligned, generally with the display end portion 16. The first refractive surface 26 is angled with respect to the viewing surface 18 of the display end portion 16. As shown in FIG. 2, the first refractive surface 26 is angled 45 degrees with respect to the viewing surface 18, although other angles are contemplated depending upon the particular application.

Referring again to FIG. 2, an opaque substrate 28 is applied to the first refractive surface 26. The refractive surface 26 reflects light from the receiving end portion 14 of the lightpipe body 12 to the display end portion 16. The opaque substrate 28 may preferably be any conventional opaque substrate. For example, the opaque substrate 28 may preferably be a high gloss opaque enamel that is applied to the refractive surface 26. Alternatively, a separate opaque member may be mounted or affixed to the refractive surface 26 in any conventional manner. The substrate 28 may preferably be a thin layer, although the thickness of the substrate 28 may vary depending upon the particular application. By reflecting light from the receiving end portion 14 to the display end portion 16, the opaque substrate 28 prevents the light from exiting through other regions of the lightpipe body 12. In particular, the substrate 28 prevents light from exiting the lightpipe body 12 through the refractive surface 26. As a result, the maximum amount of light is directed to the display end portion 16 for viewing by the user. In addition, the opaque substrate 28 acts as a "viewing screen" that can be seen by the user via the display end portion 16. The opaque substrate 28 provides an even distribution of light rays, and reflects the light rays toward the display end portion 16. The opaque substrate 28 may preferably be comprised of a color that matches the color of the light being transmitted through the lightpipe body 12. For example, if the light that is being transmitted through the lightpipe body 12 is red, the substrate 28 may preferably have a red color. Matching the color of the substrate 28 with the color of the light being transmitted further amplifies that brightness and clarity of the light at the display end portion 16 viewed by the user.

Referring again to FIG. 2, a circuit board 30 may preferably be mounted within the outer protective enclosure 20. The circuit board 30 may preferably be any conventional printed circuit board, and may preferably be mounted within the outer protective enclosure 20 in any conventional manner. A light source 32 for generating visible light may preferably be mounted on the circuit board 30. The light source 32 may preferably be mounted to the circuit board 30 in any conventional manner. In the embodiment shown, the light source 32 is in communication with the lightpipe body 12. In particular, the light source 32 is in communication with the receiving end portion 14. The light source 32 may preferably be a light emitting diode, or any other conventional electronic device capable of emitting light.

Referring again to FIG. 2, the lightpipe body 12 may also include a second refractive surface 34. The second refractive surface 34 may preferably be positioned between the first refractive surface 26 and the receiving end portion 14. In the embodiment shown, the second refractive surface 34 is positioned opposite the first refractive surface 26. The second refractive surface 34 may preferably be angled with respect to the receiving end portion 14 to direct the light from the receiving end portion 14 to the first refractive surface 26. The second refractive surface 34 may preferably be angled 45 degrees with respect to the receiving end portion 14, although this angle may vary, and other angles are contemplated depending upon the particular application.

Figure 3:
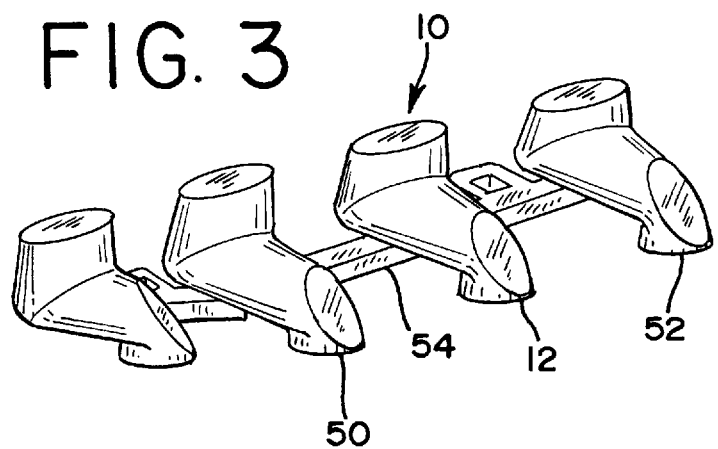
FIG. 3 is a perspective view showing a plurality of lightpipe bodies spaced apart along a support member.
Figure 4:
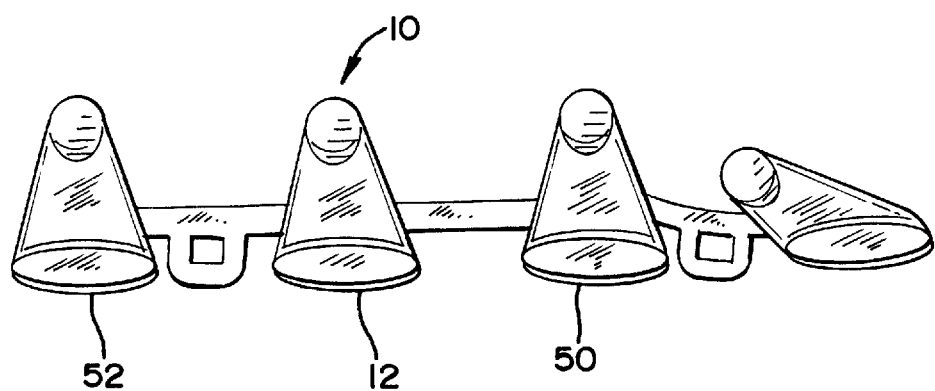
FIG. 4 is a top view of the embodiment of FIG. 3.
Figure 5:
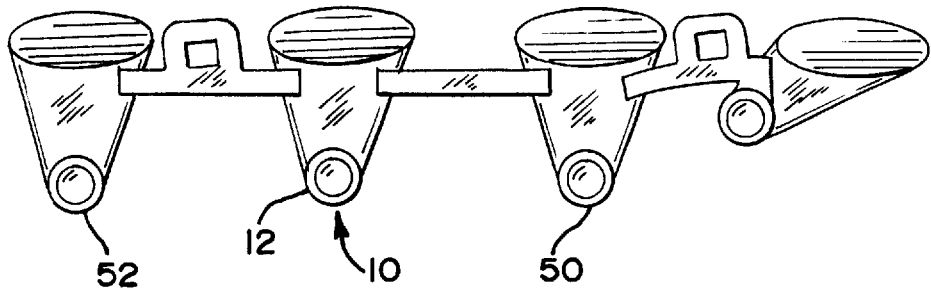
FIG. 5 is a bottom view of the embodiment of FIG. 3.

As shown in FIGS. 3–5, in addition to lightpipe body 12, a plurality of other lightpipe bodies 50 and 52 may be provided. Each of the plurality of lightpipe bodies 50 and 52 may have the same configuration as lightpipe body 12. Lightpipe bodies 12, 50, and 52, may preferably be spaced apart along support member 54. The number of lightpipe bodies 12, 50, and 52 may vary depending upon the desired number of light indicators required for the particular application.

In operation, and referring to FIG. 2, the light source 32 generates visible light, which is received in the receiving end portion 14 of the lightpipe body 12. The visible light is then reflected from the second refractive surface 34 to the first refractive surface 26. The light is then reflected from the first refractive surface 26 having the opaque substrate 28 applied thereto to the display end portion 16. The opaque substrate 28 directs the light rays to the display end portion 16 thereby preventing light loss and the unequal distribution of light. The substrate 28 also acts as a "viewing screen" that further provides a desirable soft iridescent illumination.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A lightpipe apparatus comprising:
a lightpipe body for transmitting light, the lightpipe body including a receiving end portion for receiving the light and a display end portion, the lightpipe body further including a first refractive surface disposed between the receiving end portion and the display end portion, an opaque substrate applied to the first refractive surface to reflect the light toward the display end portion wherein the opaque substrate is visible to a user from the display end portion.

2. The lightpipe apparatus of claim 1 wherein the lightpipe body is comprised of a transparent material.

3. The lightpipe apparatus of claim 2 wherein the transparent material is comprised of a polycarbonate.

4. The lightpipe apparatus of claim 1 wherein the receiving end portion has a concave shape.

5. The lightpipe apparatus of claim 1 wherein the first refractive surface is aligned with the display end portion.

6. The lightpipe apparatus of claim 1 wherein the display end portion includes a viewing surface.

7. The lightpipe apparatus of claim 6 wherein the viewing surface has an oval shape.

8. The lightpipe apparatus of claim 6 wherein the first refractive surface is angled with respect to the viewing surface.

9. The lightpipe apparatus of claim 8 wherein the first refractive surface is angled approximately 45 degrees with respect to the viewing surface.

10. The The lightpipe apparatus of claim 9 wherein the first refractive surface is angled 45 degrees with respect to the viewing surface.

11. The lightpipe apparatus of claim 1 further including a light source in communication with the receiving end portion of the lightpipe body.

12. The lightpipe apparatus of claim 11 wherein the light source is a light emitting diode.

13. The lightpipe apparatus of claim 11 further including a circuit board, the light source mounted to the circuit board.

14. The lightpipe apparatus of claim 1 wherein the lightpipe body includes a second refractive surface, the second refractive surface positioned between the first refractive surface and the receiving end portion.

15. The lightpipe apparatus of claim 14 wherein the second refractive surface is positioned opposite the first refractive surface.

16. The lightpipe apparatus of claim 15 wherein the second refractive surface is angled with respect to the receiving end portion to direct the light from the receiving end portion to the first refractive surface.

17. The lightpipe apparatus of claim 16 wherein the second refractive surface is angled approximately 45 degrees with respect to the receiving end portion.

18. The lightpipe apparatus of claim 17 wherein the second refractive surface is angled 45 degrees with respect to the receiving end portion.

19. A method of transmitting light through a lightpipe apparatus comprising:
a lightpipe body, the lightpipe body including a receiving end portion for receiving the light and a display end portion, the lightpipe body further including a first refractive surface disposed between the receiving end portion and the display end portion, an opaque substrate applied to the first refractive surface wherein the opaque substrate is visible to a user from the display end portion;
directing the light into the receiving end portion;
directing the light from the receiving end portion to the first refractive surface and the opaque substrate; and
reflecting the light from the first refractive surface toward the display end portion.

20. The method of claim 19 further comprising:
providing a second refractive surface;
positioning the second refractive surface between the first refractive surface and the receiving end portion;
directing the light from the receiving end portion to the second refractive surface; and
reflecting the light from the second refractive surface to the first refractive surface.

21. An electronic device comprising:
an outer protective enclosure, a circuit board mounted within the outer protective enclosure, a light source for generating tight mounted on the circuit board, a lightpipe apparatus disposed within the outer protective enclosure and in communication with the light source, the lightpipe apparatus comprising a lightpipe body for transmitting the light, the lightpipe body including a receiving end portion for receiving the light and a display end portion, the lightpipe body further including a first refractive surface disposed between the receiving end portion and the display end portion, an opaque substrate applied to the first refractive surface to reflect the light toward the display end portion wherein the opaque substrate is visible to a user from the display end portion.

22. The electronic device of claim 21 wherein the electronic device is a modem.

23. The electronic device of claim 21 wherein the outer protective enclosure includes at least one opening and wherein the display end portion extends through the opening.

24. The electronic device of claim 21 wherein the receiving end portion is in communication with the light source.

25. A system for transmitting light comprising:
a plurality of lightpipe bodies for transmitting light spaced apart along a support member, each of the plurality of lightpipe bodies including a receiving end portion for receiving the light and a display end portion, each of the lightpipe bodies further including a first refractive surface disposed between the receiving end portion and the display end portion, an opaque substrate applied to the first refractive surface to reflect the light toward the display end portion wherein the opaque substrate is visible to a user from the display end portion.

* * * * *